United States Patent [19]

Beyer et al.

[11] Patent Number: 4,644,700
[45] Date of Patent: Feb. 24, 1987

[54] TAILSTOCK FOR UNIVERSAL GRINDING MACHINES

[75] Inventors: Rudolf Beyer, Esslingen; Lutz-Peter Heerdt, Altbach; Roland Schemel, Stuttgart, all of Fed. Rep. of Germany

[73] Assignee: Schaudt Maschinenbau GmbH, Stuttgart, Fed. Rep. of Germany

[21] Appl. No.: 734,906

[22] Filed: May 16, 1985

[30] Foreign Application Priority Data

May 30, 1984 [DE] Fed. Rep. of Germany ....... 3420207

[51] Int. Cl.4 .................................. B24B 5/18
[52] U.S. Cl. .................. 51/237 T; 51/103 C; 51/105 R; 51/260
[58] Field of Search ............... 51/103 R, 237 T, 277, 51/260, 3, 103 C, 237 R, 105 R, 108 R, 131.1, 134, 236 R, 216 H, 95 TG, 166 T; 82/33 R, 38 R, 31, 2

[56] References Cited

U.S. PATENT DOCUMENTS 2,251,961  8/1941  Snader ........................ 51/95 TG
2,449,459  9/1948  Eckert ........................ 51/216 H
2,665,589  1/1954  Rusher ....................... 51/216 ND
2,911,767 11/1959  Sielemann .................... 51/166 T Primary Examiner—Robert P. Olszewski
Assistant Examiner—Maurina Rachuba
Attorney, Agent, or Firm—Peter K. Kontler

[57] ABSTRACT

The tailstock of a universal grinding machine has a lower part which is affixed to the frame at a level below the indexible head for a set of grinding spindles, and an upper part which supports one or more dead centers and is indexible relative to the lower part about a horizontal axis extending at right angles to the axis or axes of the center or centers. The upper part of the tailstock has several facets and the number of such facets exceeds the number of dead centers by at least one. Each center is mounted on a discrete facet and the unoccupied facet is indexed to a position below the material removing station of the grinding machine when the head is to be indexed whereby the center or centers on the upper part of the tailstock cannot interfere with movements of the selected grinding wheel to and from the material removing station. The head can support a grinding wheel for removal of material from cylindrical external surfaces of workpieces, a grinding wheel for removal of material from cylindrical internal surfaces of workpieces, and a grinding wheel for removal of material from flat surfaces.

19 Claims, 6 Drawing Figures

TAILSTOCK FOR UNIVERSAL GRINDING MACHINES

BACKGROUND OF THE INVENTION

The present invention relates to machine tools in general, and more particularly to improvements in supports which can be used in machine tools to engage portions of workpieces during treatment at a material removing station. Still more particularly, the invention relates to improvements in tailstocks which can be used with advantage in so-called universal grinding machines wherein an indexible head carries several spindles each of which can support and transmit torque to a discrete grinding wheel or to a cluster of two or more coaxial grinding wheels.

Universal grinding machines are designed to remove material from different types of workpieces without any exchange of tools. Thus, one of the grinding wheels can be used to remove material from external cylindrical surfaces, another grinding wheel can be used to remove material from internal cylindrical surfaces, and a third grinding wheel can be used to remove material from flat or substantially flat surfaces. The machines are designed in such a way that the idle grinding wheels can remain on their spindles while a selected grinding wheel treats a workpiece at the material removing station. The head is normally indexible to a number of different positions, at least one for each of its spindles, so that it can move a selected grinding wheel to the operative position. Those parts of the grinding machine which are located in the path of movement of the head during indexing of a selected spindle and of its grinding wheel to or from the material removing station must be moved out of the way or detached from the machine. This entails extensive periods of idleness of the machine. For example, if a workpiece is held between the centers of a headstock and a tailstock during removal of material from its external surface, the headstock as well as the tailstock must be located close to the material removing station in order to ensure adequate retention of the workpiece between the respective centers. However, such supports for the workpiece are at least likely to prevent indexing of the grinding wheel which is to be used or which was used for removal of material from the external surface of the workpiece between the two centers. Therefore, at least one of these supports (i.e., the headstock or the tailstock) must be detached from the frame of the universal grinding machine or it must be shifted, in its entirety, to a position sufficiently remote from the material removing station to allow for indexing of the head and of the spindles and grinding wheels thereon. Thus, it is necessary to detach at least one of the supports or it is necessary to enlarge the frame of the universal grinding machine so as to provide room for a shifting of the headstock and/or tailstock to a position in which the thus shifted support is sufficiently remote from the material removing station for unimpeded indexing of the head. Neither of these solutions is satisfactory. Furthermore, it is necessary to dismantle the tailstock or to move it out of the way if a workpiece which was held between the centers of the headstock and the tailstock is to be followed by a workpiece which is to be held and rotated by the headstock alone, e.g., in order to enable a grinding wheel to remove material from the surface surrounding an axial bore in one end face of the workpiece.

OBJECTS AND SUMMARY OF THE INVENTION

An object of the invention is to provide a novel and improved support for workpieces in machine tools and to construct and assemble the support in such a way that it can adequately engage and hold a workpiece as well as permit other parts of the machine tool to pass by when the need arises.

Another object of the invention is to provide a novel and improved tailstock for use in universal grinding and analogous machines.

A further object of the invention is to provide a tailstock which allows for rapid and convenient changes in the setup of a versatile machine tool.

An additional object of the invention is to provide a tailstock which can be used in existing machine tools as a superior substitute for heretofore known and used tailstocks.

Still another object of the invention is to provide a versatile tailstock which can adequately support different types of workpieces and which is more compact than conventional tailstocks.

A further object of the invention is to provide a novel and improved machine tool which embodies the above outlined tailstock.

An additional object of the invention is to provide a novel and improved universal grinding machine which embodies the above outlined tailstock.

Another object of the invention is to provide a novel and improved method of converting a universal grinding machine for treatment of different types of workpieces.

A further object of the invention is to provide a tailstock which permits for complete or substantially complete automation of changes in the setup of a machine tool, such as a universal grinding machine.

Another object of the invention is to provide a tailstock which comprises a plurality of centers and embodies the above outlined features and advantages.

The invention resides in the provision of a machine tool, particularly a universal grinding machine, which comprises a frame, a carrier which is mounted in the frame and has at least one tool supporting device and is movable relative to the frame so as to place the tool supporting device in a predetermined position in which the tool which is supported by such device is located at the treating (e.g., material removing) station of the machine tool, and a work support (e.g., a tailstock) which includes a first portion mounted in (preferably fixedly secured to) the frame and a second portion having at least one work-contacting component (as a rule a dead center) and being movable relative to the first portion between a first position in which the work-contacting component is ready to engage a workpiece which is to be treated by the tool in or on the tool supporting device occupying the predetermined position and in which the second portion of the support is at least likely to interfere with movements of the carrier relative to the frame, and at least one second position in which the second portion of the support permits movements of the tool supporting device and of the tool which is held thereby to and from the predetermined position. The carrier can include or constitute a grinding spindle head and the tool supporting device can constitute a grinding spindle (i.e., a spindle which can transmit torque to a grinding wheel).

The second portion of the support is preferably indexible with reference to the first portion about an axis which is normal or at least substantially normal to the axis of the dead center carried by the second portion. Such machine tool preferably further comprises means for indexing the second portion of the support with reference to the first portion. Still further, such machine tool preferably comprises means for releasably holding the second portion of the support in any one of its positions with reference to the first portion. The holding means can comprise a rotary member (e.g., an index disc) which is indexible with the second portion of the support and a detent member (e.g., a reciprocable locking bolt) which is movable into and from locking engagement with the rotary member. To this end, the periphery of the disc-shaped rotary member can be provided with a plurality of sockets in the form of notches and the detent member then includes a portion (e.g., a pointed or blade-like tip) which is receivable in a selected socket of the rotary member. The detent member is preferably movable substantially or exactly radially of the rotary member and the latter is provided with a notch or socket for each position of the second portion of the support relative to the first portion. The machine tool can comprise prime mover means for moving the detent member with reference to the rotary member. Such prime mover means can comprise a fluid-operated motor. In addition to or in lieu of the prime mover means, the machine tool preferably further comprises a tension spring or other suitable means for yieldably biasing the detent member into locking engagement with the rotary member so as to ensure that the second portion of the support can be held in a predetermined angular position with reference to the first portion even in the event of failure of the prime mover means for the detent member.

In accordance with a presently preferred embodiment of the invention, the second portion of the support is indexible through angles of 120° to three different positions with reference to the first portion and has three facets making angles of 120°. The work-contacting component (as mentioned above, such component can constitute a dead center) is then provided on one of the facets and a different facet is adjacent to the tool supporting device which occupies the predetermined position in each of the three different positions of the second portion of the support with reference to the first portion. The machine tool can comprise an additional dead center which is then provided on another facet whereas the third facet remains unoccupied so that it allows for movements of the tool supporting devices to and from the predetermined position when such third facet is adjacent to the tool supporting device occupying the predetermined position.

The means for indexing the second portion of the support can include a shaft which is rotatably journalled in the first portion for movement about the predetermined axis and is affixed to the second portion, a gear which is provided on the shaft, a toothed rack which mates with the gear and is reciprocable in the frame and/or in the first portion of the support, and means for reciprocating the rack relative to the shaft. Such reciprocating means can comprise one or more fluid-operated motors. The machine tool preferably further comprises means for preventing stray movements of the toothed rack relative to the gear; such means can include a plate-like pusher and a set of coil springs or other suitable resilient means for biasing the pusher against the rack.

The carrier can be mounted for indexing movement with reference to the frame between at least three different positions and is then provided with three discrete tool supporting devices so that each indexing movement of the carrier entails the placing of a different tool supporting device in the predetermined position.

In accordance with a presently preferred embodiment, particularly if the invention is embodied in a universal grinding machine, at least a part of the first portion of the support is disposed at a level below the second portion, and the latter is preferably indexible about a substantially horizontal axis. The carrier can be indexed about a vertical axis.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
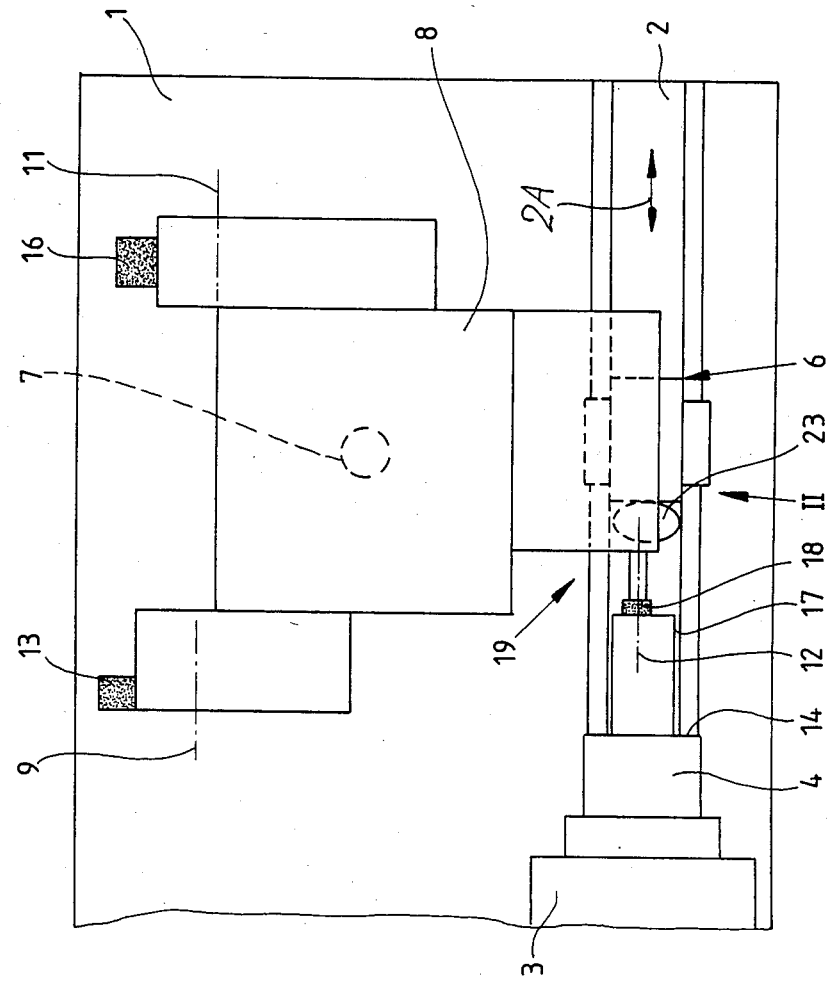
FIG. 1 is a fragmentary plan view of a universal grinding machine having an indexible head for three grinding spindles and a tailstock which is constructed, assembled and mounted in accordance with the invention, an unoccupied facet of the second portion of the tailstock being located at the material removing station so that the tailstock cannot interfere with indexing movements of the head.
Figure 6:
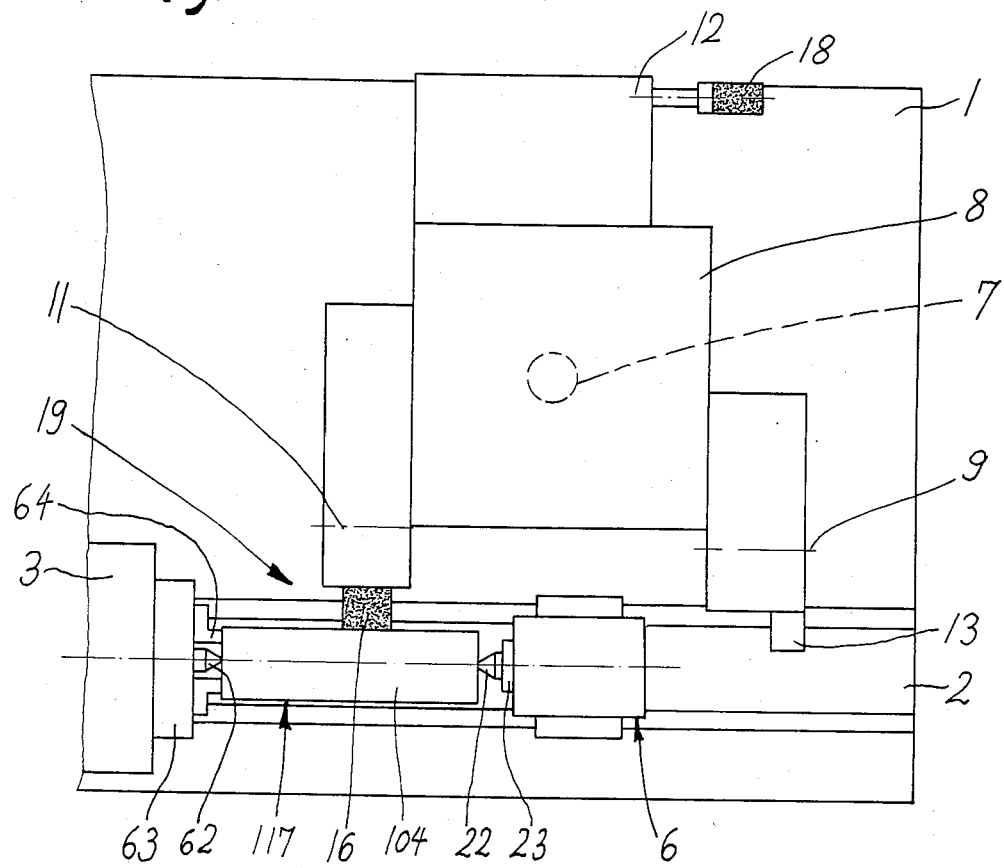
FIG. 6 is a plan view similar to that of FIG. 1 but showing the head in a different angular position and the dead center of the second portion of the tailstock at the material removing station.

Referring first to FIGS. 1 and 6, there is shown a universal grinding machine which comprises a frame including a base or bed 1 and a table 2 which is reciprocable on the base in directions indicated by a double-headed arrow 2A. The table 2 supports a headstock 3 which is reciprocable therewith in the directions indicated by arrow 2A and carries a workpiece 4. The table 2 further reciprocably supports a work support in the form of a tailstock 6 which is constructed, mounted and assembled in accordance with a feature of the invention. The tailstock 6 is put to use when a workpiece (see the workpiece 104 of FIG. 6) is held between two centers 62 and 22 while its peripheral surface (117 in FIG. 6) is treated by a grinding wheel 16 which is one of three discrete grinding wheels used in the machine tool of FIGS. 1 and 6.

The base or bed 1 of the machine frame further supports a grinding spindle carrier or head 8 which is indexible about the axis of a vertical shaft 7 in a manner not forming part of the invention. The head or carrier 8 is indexible through angles of 90° so as to move one of three discrete tool supporting devices (grinding spindles) 9, 11 and 12 (each denoted in FIGS. 1 and 6 by a phantom line) to a predetermined position at a treating or material removing station 19. The spindle 9 supports at least one grinding wheel 13 which is designed to remove material from plane surfaces of workpieces (note the flat annular surface 14 of the workpiece 4 which is held by the headstock 3 of FIG. 1), the spindle 11 supports the aforementioned grinding wheel 16 which can remove material from the cylindrical external surface (17 or 117) of a workpiece (4 or 104) while such workpiece is held between two centers (62, 22) and the respective spindle 11 is located at the material removing station 19, and the spindle 12 supports a grinding wheel 18 which (as shown in FIG. 1) can remove material from an internal surface surrounding a bore or hole in the end face of the workpiece 4 shown in FIG. 1 when the spindle 12 is located at the material removing station 19.

The tailstock 6 can remain in the position of FIG. 1 even if its center 22 is not in actual use, and this tailstock does not interfere with indexing of the head or carrier 8 about the axis of the shaft 7. This is due to the novel construction and mounting of the tailstock 6. Thus, and as can be seen in each of FIGS. 2 to 5, the tailstock 6 comprises a first portion 21 which is mounted on the table 2 and a second portion 36 which is movable with reference to the first portion 21 between a plurality of different positions including the position shown in FIG. 2. In such position of the second portion 36, the head 8 can be immediately adjacent to one (28) of three mutually inclined facets (28, 29, 31) of the second portion 36. The facet 29 is provided with a housing or casing 23 for the dead center 22 whose axis is indicated by the phantom line 26. The second portion 36 of the tailstock 6 is indexible about a horizontal axis 27 which is defined by a shaft 24 and is disposed at right angles to the axis 26 of the center 22. The facet 31 is also unoccupied. One of the facets 28, 31 can carry a second center (the housing 123 of such second center is indicated in FIG. 2 by phantom lines) as long as one of the three facets 28, 29, 31 remains exposed so as to be movable to the position occupied in FIG. 2 by the facet 28.

Figure 2:
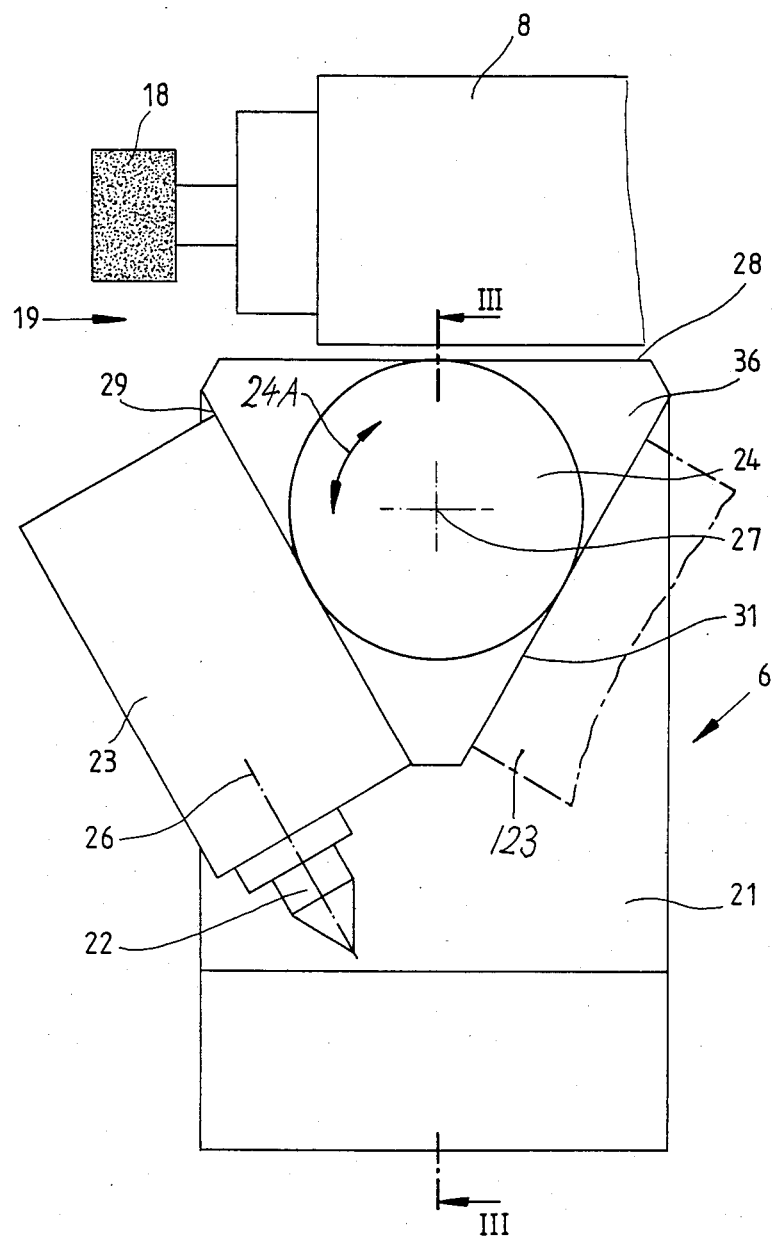
FIG. 2 is an enlarged front elevational view of the tailstock substantially as seen in the direction of arrow II in FIG. 1.

When the grinding wheel 18 of FIG. 2 is in the process of removing material from the internal surface of the workpiece 4 shown in FIG. 1, the headstock 3 is or can be located in close or immediate proximity of the tailstock 6 but the latter does not interfere with movements of the workpiece 4 and/or head 8 relative to the frame of the grinding machine. This is due to the fact that the second portion 36 of the tailstock 6 is indexible relative to the first portion 21 so as to place an unoccupied facet (28) into immediate proximity of the material removing station 19. At least a part of the first portion 21 of the tailstock 6 shown in FIGS. 1 to 6 is located at a level below the second portion 36. The level of the unoccupied facet 28 shown in FIG. 2 is selected in such a way that the head 8 can be indexed to any one of its four different positions (through angles of 90°) in order to move the grinding wheel 13, 16 or 18 to the material removing station 19 or to leave the station 19 unoccupied (in response to clockwise indexing of the head 8 through 90° beyond the position shown in FIG. 1).

In the embodiment which is shown in the drawing, the second portion 36 of the tailstock 6 is indexible through angles of 120° in a clockwise and/or in a counterclockwise direction, as viewed in FIG. 2. The housing 123 can support a dead center which is identical with the center 22, a different dead center or a different work-contacting component.

Figure 3:
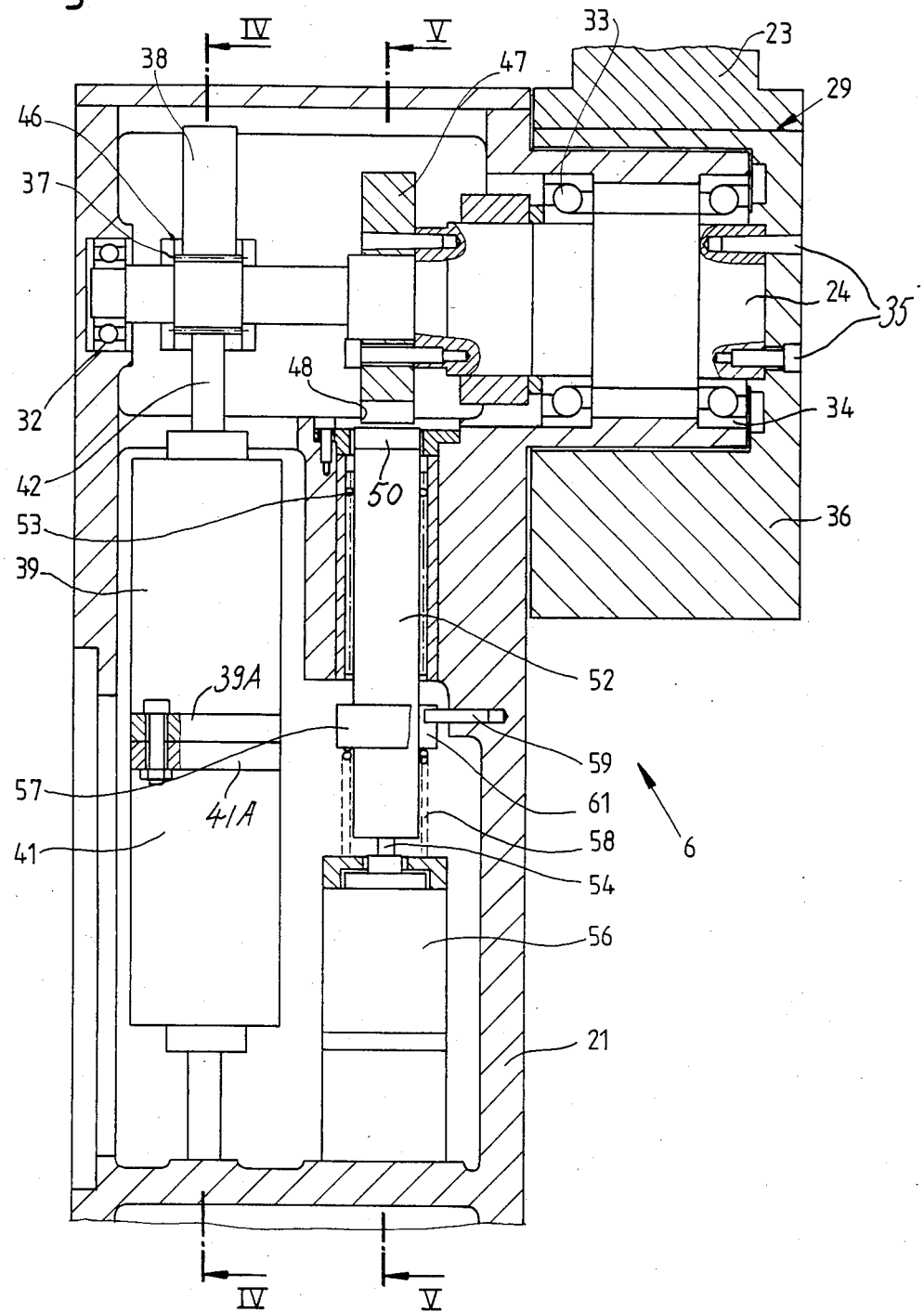
FIG. 3 is an enlarged fragmentary vertical sectional view as seen in the direction of arrows from the line III—III of FIG., 2.
Figure 4:
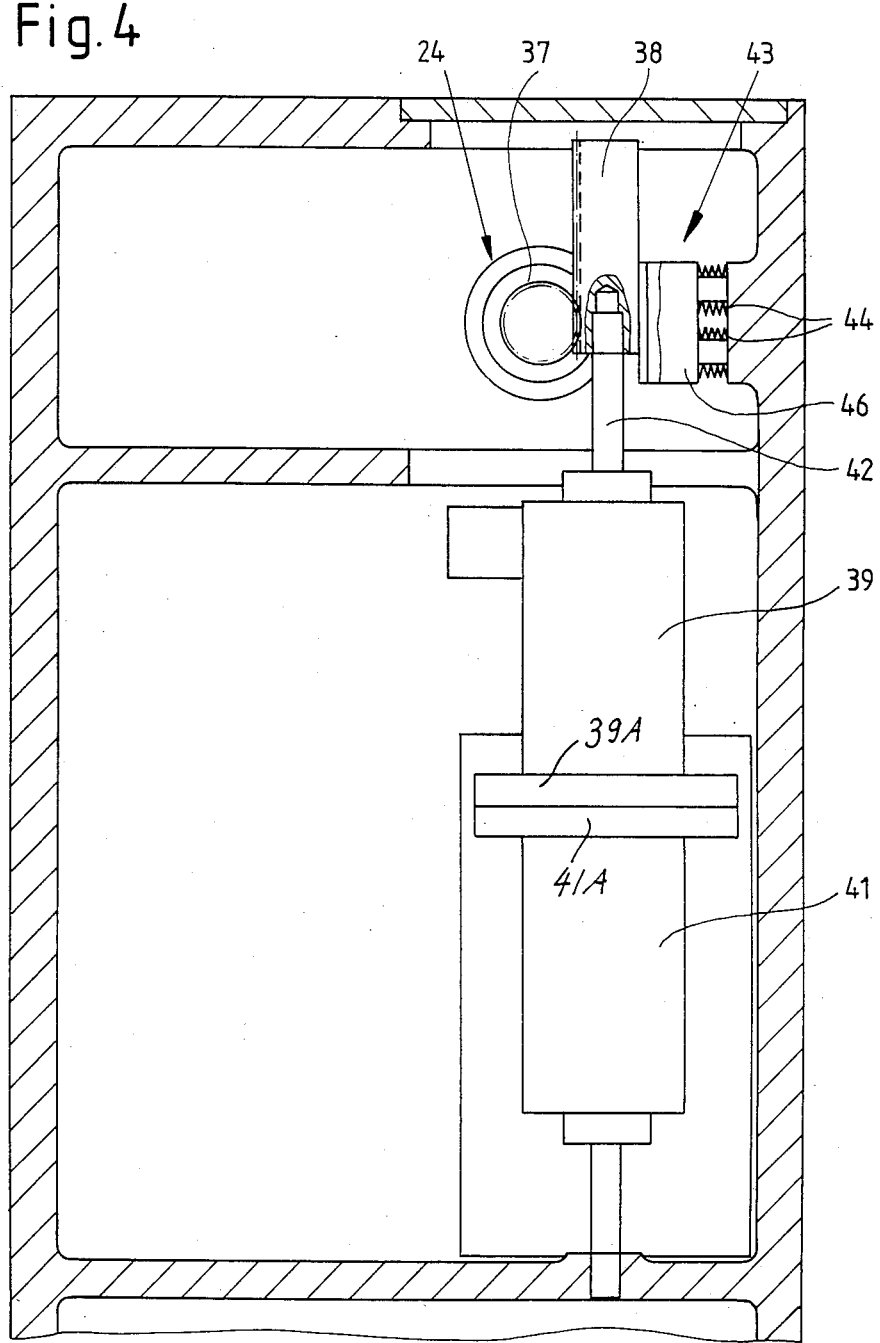
FIG. 4 is a sectional view as seen in the direction of arrows from the line IV—IV of FIG. 3.
Figure 5:
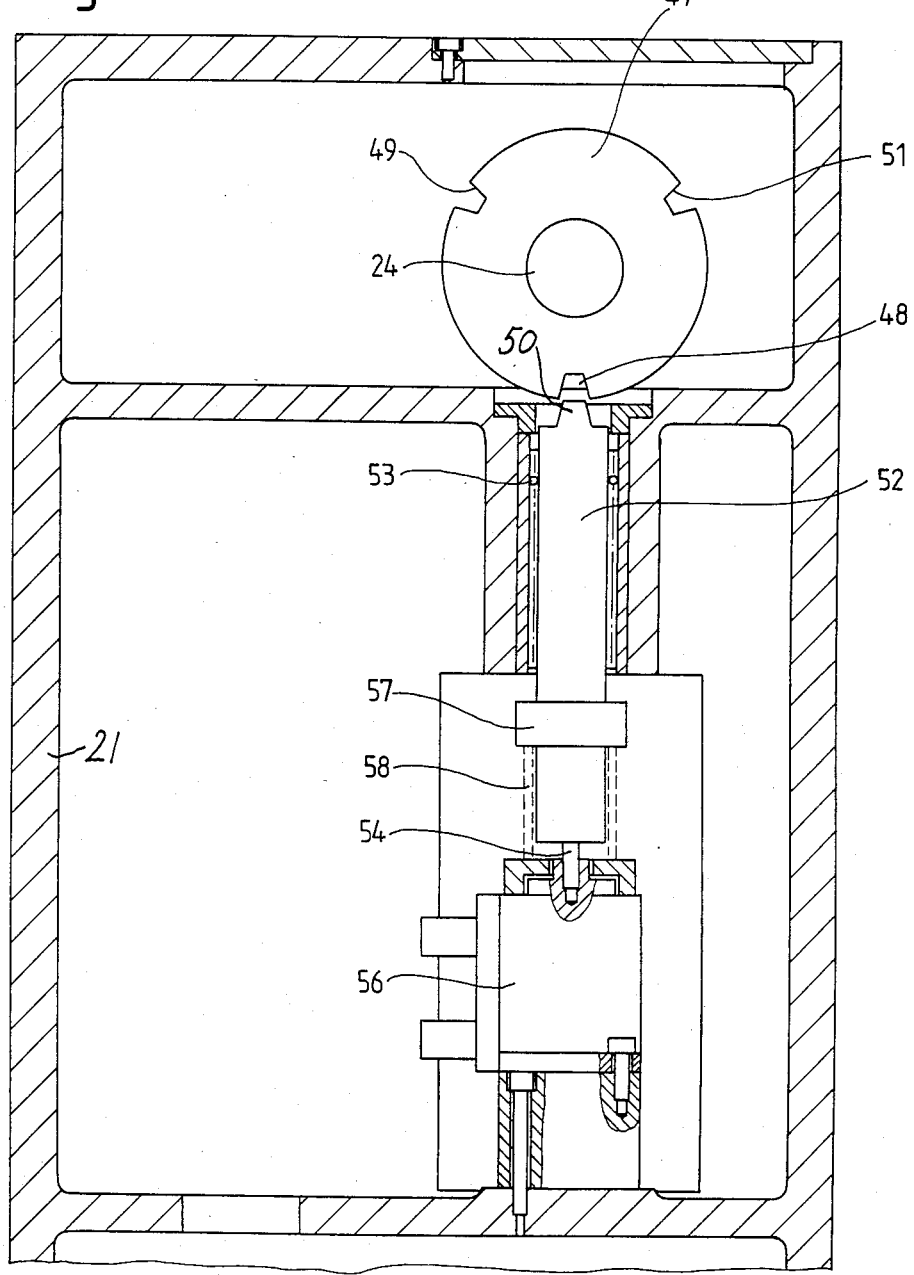
FIG. 5 is a sectional view as seen in the direction of arrows from the line V—V of FIG. 3.

The details of the means for indexing the second portion 36 and other features of the improved tailstock 6 are illustrated in FIGS. 3 to 5. The shaft 24 for the second portion 36 is bolted and pinned to the portion 36 (this is shown at 35 in FIG. 3) and this shaft is journalled in three antifriction ball bearings 32, 33, 34 which are installed in the first portion 21. The indexing means further comprises a gear 37 which is coaxially secured to or is an integral pinion of the shaft 24 and mates with a reciprocable toothed rack 38. The means for reciprocating the toothed rack 38 comprises two fluid-operated (hydraulic or pneumatic) motors 39, 41 whose flanges 39A, 41A are bolted to each other and which can be actuated to move the toothed rack 38 up or down, as viewed in FIG. 3. This causes the entire second portion 36 of the tailstock 6 to turn in one of the directions indicated in FIG. 2 by the double-headed arrow 24A, always through an angle of 120°, whereby the position occupied in FIG. 2 by the facet 28 is taken up by the facet 29 or 31. The motors 39, 41 have a common piston rod 42 which is integral with or separably connected to one end of the toothed rack 38.

The tailstock 6 preferably further comprises means 43 for preventing stray movements of the toothed rack 38 with reference to the gear 37 and shaft 24. Such means comprises a plate-like pusher 46 (see FIG. 4) and a set of prestressed coil springs 44 which bias the pusher 46 against one side of the toothed rack 38. The pusher 46 is biased against that side of the rack 38 which faces away from the gear 37 on the shaft 24.

Still further, the tailstock 6 comprises means for releasably holding and locking the second portion 36 in a selected angular position. Such holding and locking means comprises a rotary member 47 in the form of an index disc (see particularly FIGS. 3 and 5) whose peripheral surface is provided with three equidistant recesses or sockets 48, 49, 51 in the form of notches each of which can receive the suitably configurated front end portion or tip 50 of a male detent member 52 in the form of a locking bolt which is movable radially of the rotary member 47 by a fluid-operated (hydraulic or pneumatic) motor 56 whose piston rod 54 is attached to the rear end portion of the detent member 52. The latter is reciprocable in a bearing including one or more annuli of spherical rolling elements 53. The rotary member 47 is rigidly secured to the shaft 24 between the second portion 36 and the gear 37 (see FIG. 3). The mutual spacing of neighboring sockets 48, 49, 51 is 120°, the same as the mutual inclination of neighboring facets 28, 29, 31. The detent member 52 is reciprocable, without any or with negligible play, in the first portion 21 of the tailstock 6.

In order to ensure that the second portion 36 of the tailstock 6 can be reliably held in a selected angular position, even in the event of temporary or total failure of the motor 56, the tailstock preferably further comprises a prestressed coil spring 58 which reacts against the housing of the motor 56 and/or against a part of the first portion 21 and bears against a collar 57 of the detent member 52 so as to permanently urge the latter upwardly, as viewed in FIG. 5, in order to ensure that the end portion 50 of the detent member 52 cannot accidentally leave the adjacent socket 48, 49 or 51.

The detent member 52 is held against rotation about its own axis by a guide pin 59 which is mounted in the first portion 21 and extends into an axially parallel peripheral slot or groove 61 of the collar 57.

FIG. 6 shows the head 8 indexed (twice) through 180° from the position of FIG. 1. Also, the second portion 36 of the tailstock 6 is indexed through 120° relative to the position of FIG. 1 so that the facet 29 occupies the position previously occupied by the facet 28 and the center 22 engages the right-hand end face of the workpiece 104. The other end face of the workpiece 104 is engaged by the center 62 of the headstock 3 which is further provided with torque-transmitting elements 64 serving to rotate the workpiece 104 so that the grinding wheel 16 can remove material from the peripheral surface 117. The elements 64 have pointed tips or cutting edges which bite into the material of the workpiece 104 to thus ensure the transmission of torque in response to rotation of an insert 63 which is installed in the headstock 3 and is driven to rotate about the common axis of the centers 62 and 22. If the center 22 is located in the path of movement of the spindle 11 and/or grinding wheel 16 when the head 8 is to be indexed from the position of FIG. 6, the second portion 36 of the tailstock 6 is indexed back to the position of FIG. 2 so that the facet 28 is adjacent to the material removing station 19 before the means for indexing the head 8 is started in order to return the grinding wheel 18 or to move the grinding wheel 13 to the station 19.

The improved tailstock 6 is susceptible of many modifications without departing from the spirit of the invention. For example, the second portion 36 and its dead center or dead centers can be mounted for reciprocatory movement with reference to the first portion 21 in order to move the selected center nearer to or further away from the material removing station 19. To this end, the second portion 36 can be provided with or can constitute a carriage which is reciprocable relative to the first portion 21. The illustrated construction with an indexible second portion 36 is preferred at this time because it is more compact and because the movements of a single or a selected dead center to and from the operative position take up little time. Moreover, the operation of the indexing means for the second portion 36 can be automated in a relatively simple and inexpensive way.

The movements of various parts of the tailstock 6 can be automated to a desired extent. Thus, the operation of the means for indexing the head 8, of the means for indexing the second portion 36 and of the means for operating the motor 56 for the detent member 52 can be programmed so that a change of setup is fully automated and can be completed within a very short interval of time.

An important advantage of the improved tailstock 6 and of the machine tool which embodies such tailstock is that the position of the first portion 21 of the tailstock need not be changed at all when the head 8 is to be indexed in order to move a selected spindle (9, 11 or 12) to or from the material removing station 19. Therefore, the ways on the table 2 need not be cleaned preparatory to each indexing of the head 8 in order to remove therefrom shavings, other fragments of treated workpieces, coolant and/or other substances which could interfere with shifting of the entire tailstock with reference to the machine frame. The means for indexing the second portion 36 of the tailstock 6 can be readily encapsulated in the first portion 21 so that the parts of such indexing means cannot be contaminated by fragments of workpieces or the like; this ensures that the portion 36 can be indexed without any preliminary treatment (such as cleaning) and this also contributes to rapid completion of a change of setup so that the machine is ready for the treatment of a different workpiece. Still further, the improved tailstock contributes to compactness of the entire machine tool because it need not be shifted, in its entirety, to a remote location preparatory to indexing of the head 8. Thus, the overall dimensions of the machine tool can be reduced in addition to a substantial reduction or shortening of the interval which is required to prepare the machine tool for treatment of different workpieces.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A machine tool, particularly a grinding machine, comprising a frame; a carrier mounted in said frame and having at least one tool supporting device, said carrier being movable relative to said frame so as to place the tool supporting device in a predetermined position; and a tailstock including a first portion mounted in said frame and a second portion having at least one work-contacting component and being indexible relative to said first portion about a substantially horizontal axis between a first position in which said component is ready to engage a workpiece which is to be treated by a tool in the supporting device occupying said predetermined position and in which said second portion is likely to interfere with movements of said carrier relative to said frame, and at least one second position in which said second portion permits movements of said tool supporting device and of the tool which is held thereby to and from said predetermined position, at least a part of said first portion being disposed at a level below said second portion.

2. The machine tool of claim 1, wherein said carrier includes a grinding spindle head and said tool supporting device includes a grinding spindle said work-contacting component including a dead center.

3. The machine tool of claim 1, wherein said carrier is indexible between at least three different positions and has three discrete tool supporting devices.

4. The machine tool of claim 1, wherein the first portion of said tailstock is fixedly secured to said frame.

5. The machine of claim 1 wherein said work-contacting component includes a center having a rotational axis and tailstock said substantially horizontal axis is normal to the axis of said center.

6. The machine tool of claim 5, further comprising means for indexing the second portion of said tailstock relative to said first portion.

7. The machine tool of claim 6, wherein said indexing means comprises a shaft rotatable in said first portion about said predetermined axis and connected with said second portion, a gear on said shaft, a toothed rack mating with said gear, and means for reciprocating said toothed rack relative to said shaft.

8. The machine tool of claim 7, wherein said reciprocating means comprises at least one fluid-operated motor.

9. The machine tool of claim 7, further comprising means for preventing stray movements of said toothed rack relative to said gear.

10. The machine tool of claim 9, wherein said preventing means comprises a pusher and means for biasing said pusher against said toothed rack.

11. The machine tool of claim 6, wherein the second portion of said tailstock is indexible through angles of 120° between three different positions and includes three mutually inclined facets making angles of 120°, said center being provided on one of said facets and a different facet being adjacent to the tool supporting device occupying said predetermined position in each of said three different positions of said second portion.

12. The machine tool of claim 6, further comprising means for releasably holding said second portion in any one of said positions thereof.

13. The machine tool of claim 12, wherein said holding means includes a rotary member which is indexible with said second portion and a detent member which is movable into and from locking engagement with said rotary member.

14. The machine tool of claim 13, wherein said rotary member includes a disc having a socket for each position of said second portion and said detent member includes a locking bolt movable substantially radially of said disc and including a portion arranged to enter a selected socket of said disc.

15. The machine tool of claim 13, further comprising prime mover means for moving said detent member with reference to said rotary member.

16. The machine tool of claim 15, wherein said prime mover means includes a fluid-operated motor.

17. The machine tool of claim 13, further comprising means for yieldably biasing said detent member into locking engagement with said rotary member.

18. The machine tool of claim 17, further comprising prime mover means for moving said detent member with reference to said rotary member.

19. A machine tool. particularly a grinding machine, comprising a frame; a carrier mounted in said frame and having at least one tool supporting device, said carrier being movable relative to said frame so as to place the tool supporting device in a predetermined position; a tailstock including a first portion mounted in said frame and a second portion having a first work-contacting component including a center having a rotational axis, said second portion being indexible relative to said first portion about a predetermined axis which is normal to the axis of said center through angles of 120 degrees between three different positions and including three mutually inclined facets making angles of 120 degrees, said center being provided on one of said facets and a different facet being adjacent to the tool supporting device occupying said predetermined position in each of said three different positions of said second portion, said second portion being indexible between a first position in which said component is ready to engage a workpiece which is to be treated by a tool in the supporting device occupying said predetermined position and in which said second portion is likely to interfere with movements of said carrier relative to said frame, and two second positions in which said second portion permits movements of such tool supporting device and of the tool which is held thereby to and from said predetermined position; an additional center provided on another of said facets; and means for indexing the second portion of said tailstock relative to said first portion.

* * * * *